(12) United States Patent
Yan (10) Patent No.: US 12,153,850 B2
(45) Date of Patent: Nov. 26, 2024

(54) METHOD, SYSTEM AND APPARATUS FOR DISPLAYING SEGMENTED MULTIMEDIA ON TILING DISPLAY SCREENS

(71) Applicant: BOE Technology Group Co., Ltd., Beijing (CN)

(72) Inventor: Xinquan Yan, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/033,487

(22) PCT Filed: Oct. 27, 2020

(86) PCT No.: PCT/CN2020/124112
§ 371 (c)(1),
(2) Date: Apr. 24, 2023

(87) PCT Pub. No.: WO2022/087845
PCT Pub. Date: May 5, 2022

(65) Prior Publication Data
US 2023/0409269 A1    Dec. 21, 2023

(51) Int. Cl.
*G06F 3/14*    (2006.01)
*G06T 3/40*    (2024.01)
(Continued)

(52) U.S. Cl.
CPC .......... *G06F 3/1446* (2013.01); *G06T 3/4092* (2013.01); *G06T 7/11* (2017.01);
(Continued)

(58) Field of Classification Search
CPC .......... G06T 3/4092; G06T 7/11; G09G 5/10; G09G 2356/00; G09G 2320/0626; G09G 2370/16; G09G 2320/0666; G06F 3/1446
See application file for complete search history.

(56) References Cited

U.S. PATENT DOCUMENTS

2006/0161948 A1* 7/2006 Hwa .................. H04N 21/4108
725/38
2018/0018931 A1    1/2018 Zhang
(Continued)

FOREIGN PATENT DOCUMENTS

CN    101404151 A    4/2009
CN    102857738 A    1/2013
(Continued)

OTHER PUBLICATIONS

PCT/CN2020/124112 international search report.
CN202080002497.4 first office action.

*Primary Examiner* — Deeprose Subedi
(74) *Attorney, Agent, or Firm* — IPro, PLLC (57) ABSTRACT

The present disclosure provides a terminal control method, apparatus, and system. The control method includes: generating an orchestration plan according to a program selected by a user; selecting, according to the program and the orchestration plan, from tiling screens that form a terminal, multiple tiling screens used for displaying the program; segmenting, according to the selected multiple tiling screens, a multimedia resource corresponding to the program to obtain segmented multimedia resources; and sending said multimedia resources to the multiple tiling screens, so that each tiling screen displays according to the corresponding multimedia resource and the orchestration plan.

14 Claims, 5 Drawing Sheets

(51) Int. Cl.
*G06T 3/4092* (2024.01)
*G06T 7/11* (2017.01)
*G09G 5/10* (2006.01)

(52) U.S. Cl.
CPC ....... *G09G 5/10* (2013.01); *G09G 2320/0626* (2013.01); *G09G 2320/0666* (2013.01)

(56) References Cited

U.S. PATENT DOCUMENTS

| | | |
|---|---|---|
| 2018/0090054 A1 | 3/2018 | Zhang |
| 2019/0034150 A1 | 1/2019 | Vigna et al. |
| 2022/0276773 A1 | 9/2022 | Li et al. |

FOREIGN PATENT DOCUMENTS

| | | |
|---|---|---|
| CN | 105578248 A | 5/2016 |
| CN | 105653224 A | 6/2016 |
| CN | 105867861 A | 8/2016 |
| CN | 106488274 A | 3/2017 |
| CN | 108040245 A | 5/2018 |
| CN | 108833957 A | 11/2018 |
| CN | 111510646 A | 8/2020 |
| CN | 111541913 A | 8/2020 |
| CN | 111741349 A | 10/2020 |

\* cited by examiner

METHOD, SYSTEM AND APPARATUS FOR DISPLAYING SEGMENTED MULTIMEDIA ON TILING DISPLAY SCREENS

CROSS REFERENCE TO RELATED APPLICATIONS

The present disclosure is a national phase entry under 35 U.S.C. § 371 of International Application No. PCT/CN2020/124112, filed Oct. 27, 2020, and entitled "TERMINAL CONTROL METHOD, APPARATUS, AND SYSTEM".

FIELD

The present disclosure relates to the field of display technology, and in particular, to a terminal control method, apparatus, and system.

BACKGROUND

With the development of display technology, how to realize the tiled display of multiple display screens is an urgent problem to be solved.

SUMMARY

The present disclosure provides a terminal control method, apparatus, and system with the following specific solutions.

Embodiments of the present disclosure provide a terminal control method, including:
  generating an orchestration plan according to a program selected by a user;
  selecting, according to the program and the orchestration plan, multiple tiling screens used for displaying the program from tiling screens that form a terminal;
  segmenting, according to the selected multiple tiling screens, a multimedia resource corresponding to the program to obtain segmented multimedia resources; and
  sending the segmented multimedia resources to the multiple tiling screens to allow each tiling screen displays according to a corresponding multimedia resource and the orchestration plan.

Optionally, in the embodiments of the present disclosure, before the generating an orchestration plan according to a program selected by the user, the method further includes:
  receiving material uploaded by a user, the material includes audio, video and a picture; and
  generating the program according to the material, and setting attribute information of the program, the attribute information including a name, a description, and a category.

Optionally, in the embodiments of the present disclosure, the segmenting, according to the selected multiple tiling screens, a multimedia resource corresponding to the program to obtain segmented multimedia resources includes:
  slicing the multimedia resource corresponding to the program according to the selected multiple tiling screens to obtain sliced multimedia resources; and
  performing a super-resolution processing on the sliced multimedia resources to obtain super-resolution processed multimedia resources, and taking the super-resolution processed multimedia resources as the segmented multimedia resources.

Optionally, in the embodiments of the present disclosure, after the sending the segmented multimedia resources to the multiple tiling screens, the method further includes:
  sending an instruction for adjusting screen display parameters of each tiling screen to the terminal, such that the terminal adjusts the screen display parameters of each tiling screen in response to the instruction, the screen display parameters include white balance, brightness, and volume.

Optionally, in the embodiments of the present disclosure, after the sending the segmented multimedia resources to the multiple tiling screens, the method further includes:
  receiving working state information reported by each tiling screen to monitor the terminal, and the working state information includes running time, heartbeat information and abnormal log.

Optionally, in the embodiments of the present disclosure, after obtaining the sliced multimedia resources, the method further includes:
  determining location distribution of each tiling screen in a same rectangular coordinate system; and
  determining a multimedia resource corresponding to each tiling screen from the segmented multimedia resources according to the location distribution.

Optionally, in the embodiments of the present disclosure, the determining the location distribution of each tiling screen in the same rectangular coordinate system includes:
  determining RSSI values of three Bluetooth beacons at different locations received by each tiling screen;
  determining a distance between each tiling screen and each Bluetooth beacon based on the RSSI values;
  determining a coordinate location of each tiling screen in the same rectangular coordinate system based on the distance; and
  determining location distribution of each tiling screen in the same rectangular coordinate system based on the coordinate location.

Accordingly, the embodiments of the present disclosure provide a terminal control apparatus, including:
  a generating unit, configured to generate an orchestration plan according to a program selected by a user;
  a selecting unit, configured to select, according to the program and the orchestration plan, multiple tiling screens used for displaying the program from tiling screens that form a terminal;
  a segmenting unit, configured to segment, according to the selected multiple tiling screens, a multimedia resource corresponding to the program to obtain segmented multimedia resources; and
  a sending unit, configured to send the segmented multimedia resources to the multiple tiling screens, so that each tiling screen displays according to a corresponding multimedia resource and the orchestration plan.

Accordingly, the embodiments of the present disclosure provide a terminal control system, including:
  a control end and a terminal,
  the control end is configured to: generate an orchestration plan according to a program selected by a user; select, according to the program and the orchestration plan, multiple tiling screens used for displaying the program from tiling screens that form a terminal; segment, according to the selected multiple tiling screens, a multimedia resource corresponding to the program to obtain segmented multimedia resources; and send the segmented multimedia resources to the multiple tiling screens; and the terminal is configured to receive the segmented multimedia resources, each of the multiple tiling screens displays according to the corresponding multimedia resource.

Optionally, in the embodiments of the present disclosure, the control end includes a page controller, and the page controller is configured to:

receive material uploaded by a user, the material includes audio, video and a picture; and generate a program according to the material, and set attribute information of the program, the attribute information including a name, a description, and a category.

Optionally, in the embodiments of the present disclosure, the control end includes a server connected with the page controller, the page controller is further configured to receive an operation by a user to adjust the screen display parameters of each tiling screen, and in response to the operation, generate an instruction for adjusting the screen display parameters of each tiling screen; and send the instruction to the server, the screen display parameters including white balance, brightness, and volume; and the server is configured to receive the instruction and send the instruction to the terminal.

Optionally, in the embodiments of the present disclosure, the server is further configured to receive working state information reported by each tiling screen and send the working state information to the page controller, the working state information includes running time, heartbeat information and abnormal log; and the page controller is configured to receive the working state information and display the working state information.

Optionally, in the embodiments of the present disclosure, the server includes an AI server, and the AI server is configured to:

slice a multimedia resource corresponding to the program according to the selected multiple tiling screens to obtain sliced multimedia resources; and perform super-resolution processing on the sliced multimedia resources to obtain super-resolution processed multimedia resources, and take the super-resolution processed multimedia resources as the segmented multimedia resources.

Optionally, in the embodiments of the present disclosure, the server includes a database server, and the database server is configured to store the material and the program.

Optionally, in the embodiments of the present disclosure, the server includes a location server, and the location server is configured to:

determine location distribution of each tiling screen in a same rectangular coordinate system; and determine a multimedia resource corresponding to each tiling screen from the segmented multimedia resources according to the location distribution.

Optionally, in the embodiments of the present disclosure, the location server is configured to:

determine RSSI values of three Bluetooth beacons received by each tiling screen;

determine a distance between each tiling screen and each Bluetooth beacon based on the RSSI values;

determine a coordinate location of each tiling screen in the same rectangular coordinate system based on the distance; and determine location distribution of each tiling screen in the same rectangular coordinate system based on the coordinate location.

DETAILED DESCRIPTION OF THE EMBODIMENTS

In order to make the objectives, solutions and advantages of embodiments of the present disclosure clearer, solutions of embodiments of the present disclosure will be clearly and completely described below in conjunction with the accompanying drawings of embodiments of the present disclosure. Clearly, the described embodiments are some, but not all, embodiments of the present disclosure. The embodiments and features of the embodiments in the present disclosure may be combined with each other without conflict. Based on the described embodiments of the present disclosure, all other embodiments obtained by those of ordinary skill in the art without inventive effort fall within the scope of protection of the present disclosure.

Unless otherwise defined, technical or scientific terms used herein are to be taken as commonly understood by those of ordinary skill in the art to which this disclosure belongs. The words "including," "comprising," and the like are used in this disclosure to mean that elements or items preceding the word appear to encompass elements or items listed after the word and equivalents thereof, without excluding other elements or items.

In the prior art, how to realize the tiled display of a plurality of display screens is an urgent problem to be solved.

Figure 1:
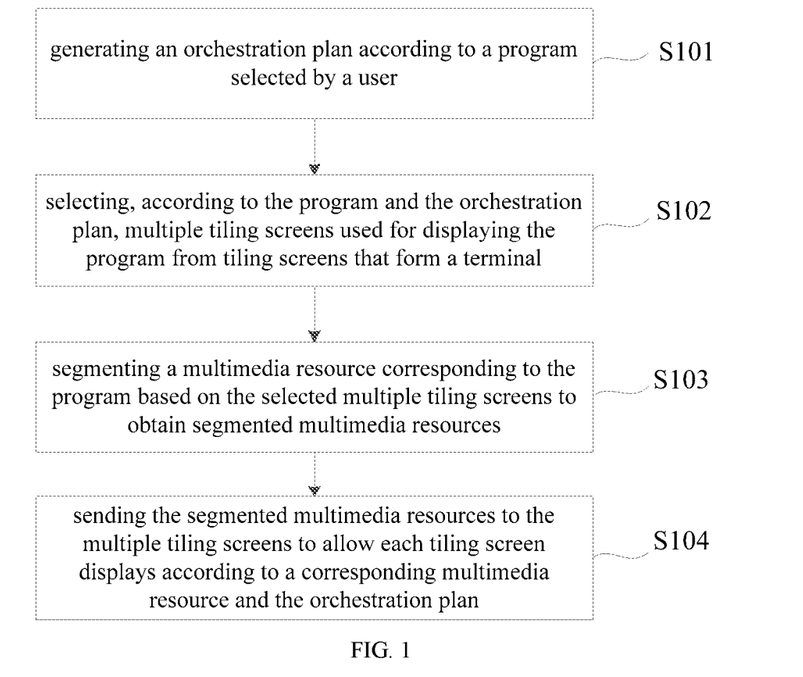
FIG. 1 is a method flowchart of a terminal control method according to an embodiment of the present disclosure.

In view of this, embodiments of the present disclosure provide a terminal control method as shown in FIG. 1, the control method includes the steps of:

S101: generating an orchestration plan according to a program selected by a user.

In specific implementation, the program may be edited and generated by a user according to actual needs, or acquired from other devices, which is not limited here. The type of the program may be news, education, entertainment, advertisement, etc., which is not limited here. The orchestration plan may be a setting of a play order, a play time period, etc. of the program selected by the user.

S102: selecting, according to the program and the orchestration plan, multiple tiling screens used for displaying the program from tiling screens that form a terminal.

In specific implementation, tiling screens for displaying the program may be selected from the terminal according to actual application needs of a user, e.g., 50 tiling screens from 100 tiling screens forming the terminal may be selected to display the program.

S103: segmenting a multimedia resource corresponding to the program based on the selected multiple tiling screens to obtain segmented multimedia resources.

In specific implementation, the multimedia resource corresponding to the program is segmented based on the selected multiple tiling screens to obtain the segmented multimedia resources. Since the segmentation of the multimedia resource corresponding to the program is the segmentation performed according to the selected multiple tiling screens, after segmentation of the multimedia resource corresponding to the program, the multimedia resources corresponding to the respective tiling screens can be determined and the tiling quality is guaranteed.

S104: sending the segmented multimedia resources to the multiple tiling screens to allow each tiling screen displays according to a corresponding multimedia resource and the orchestration plan.

In specific implementation, the segmented multimedia resources are sent to the plurality of tiling screens, such that each of the tiling screens can be displayed in accordance with the corresponding multimedia resource and the orchestration plan, thereby enabling control of the tilted display of each of the tiling screens and guaranteeing the quality of the tilted display.

Figure 2:
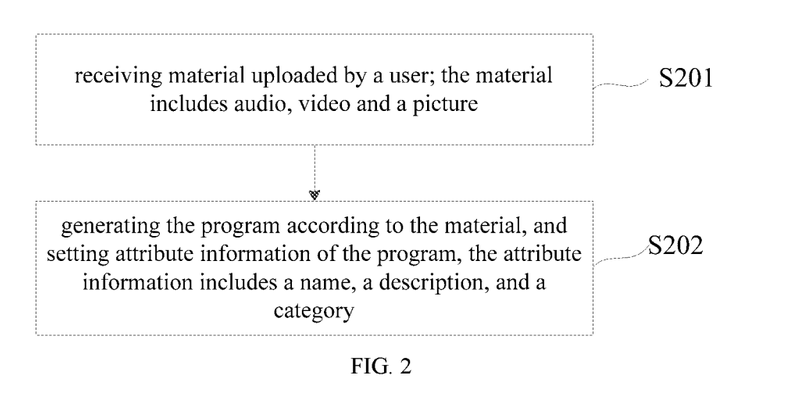
FIG. 2 is a method flowchart before a step S101 in the terminal control method according to an embodiment of the present disclosure.

In the embodiments of the present disclosure, as illustrated in FIG. 2, before the S101 of generating the orchestration plan according to the program selected by the user, the method further includes:

S201: receiving material uploaded by a user; the material includes audio, video and a picture; and S202: generating the program according to the material, and setting attribute information of the program, the attribute information includes a name, a description, and a category.

In specific implementation, the implementation for S201 to S202 is as follows.

First, material uploaded by the user is received, the material includes audio, video and a picture and may be selected by the user as desired. After receiving the material, the material can also be stored for subsequent related processing of the material. After receiving the material uploaded by the user, the program can be made according to the material, and the attribute information corresponding to the program can be set, and the attribute information includes a name, a description and a category. The description in the attribute information may be a description of the content included in the program, for example, an entertaining program, and the category in the attribute information may be variety, education, etc., which is not limited herein. For example, a picture a and video b are uploaded by the user to create a program A including the picture a and the video b, and the program category of the program A is set as a public service advertisement. In practical application, the material may be chose according to the actual needs of users, and make the required programs, which ensures the flexibility of program making and improves the user experience.

Figure 3:
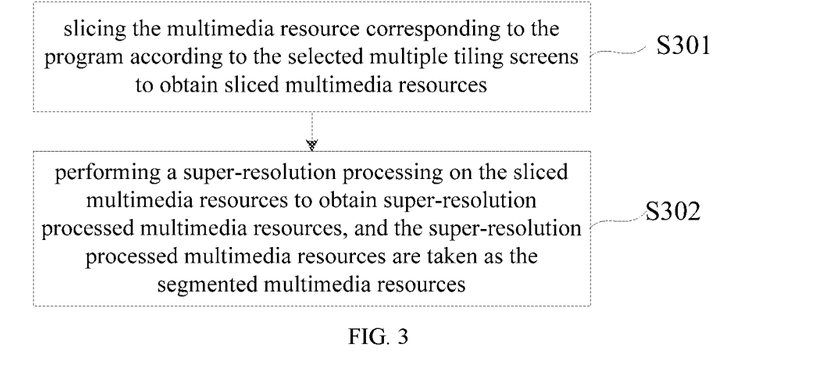
FIG. 3 is a method flow chart of a step S103 in the terminal control method according to an embodiment of the present disclosure.

In the embodiments of the present disclosure, as illustrated in FIG. 3, the S103 of segmenting the multimedia resource corresponding to the program based on the selected multiple tiling screens to obtain the segmented multimedia resources, includes:

S301: slicing the multimedia resource corresponding to the program according to the selected multiple tiling screens to obtain sliced multimedia resources; and S302: performing a super-resolution processing on the sliced multimedia resources to obtain super-resolution processed multimedia resources, and the super-resolution processed multimedia resources are taken as the segmented multimedia resources.

In specific implementation, the implementation for S301 to S302 is as follows:

firstly, according to the selected multiple tiling screens, the multimedia resource corresponding to the program is sliced to obtain the sliced multimedia resources. For example, if four tiling screens are selected, the multimedia resource corresponding to the program A can be sliced into four parts. Then, the upper-resolution processing is performed on the sliced multimedia resources to obtain the super-resolution processed multimedia resources, and the super-resolution processed multimedia resources are taken as the segmented multimedia resources. Because the resolution of the super-resolution processed multimedia resources is often high, the quality of tiled display is guaranteed. In practical application, the multimedia resource corresponding to the program can be sliced by an ordinary server, and the multimedia resource corresponding to the program can also be sliced by an AI server, which is not limited here. In addition, the super-resolution processed multimedia resources can be stored, so that the multimedia resource corresponding to each tiling screen can be determined according to the needs.

In the embodiments of the present disclosure, after the S104 of sending the segmentation multimedia resources to the multiple tiling screens, the method further includes:

sending an instruction for adjusting screen display parameters of each tiling screen to the terminal, such that the terminal adjusts the screen display parameters of each tiling screen in response to the instruction, the screen display parameters include white balance, brightness, and volume.

In specific implementation, after sending the segmented multimedia resources to the multiple tiling screens, an instruction for adjusting the screen display parameters of each tiling screen may also be sent to the terminal, so that the terminal, in response to the instruction, adjusts the screen display parameters of each tiling screen, for example, the brightness of each tiling screen is adjusted from 100 nit to 200 nit, for another example, the volume of each tiling screen is adjusted from 60% to 90%. The screen display parameters include white balance, brightness, and volume, although other parameters are possible, which is not limited herein. Furthermore, in practical applications, the issuing of the instruction may be implemented over the MQTT protocol and the IOT protocol, in this way, uniform adjustment of the screen display parameters of the individual tiling screens in the terminal may be achieved, as well as adjustment of the screen display parameters of a part of the tiling screens in the terminal may be achieved, thereby ensuring the display quality of the tiling screen while improving the efficiency of the tiling screen management.

In the embodiments of the present disclosure, after the S104 of sending the segmented multimedia resources to the multiple tiling screens, the method further includes:

receiving working state information reported by each tiling screen to monitor the terminal, the working state information includes running time, heartbeat information and abnormal log.

In specific implementation, after the segmented multimedia resources are sent to the multiple tiling screens, the working state information reported by each tiling screen is received, in this way, the terminal may be monitored. In practical applications, each tiling screen can report its working state information in real time, and can also report its working state information every other fixed duration, the working state information reported by each tiling screen can be presented to an administrator, which is convenient for the administrator to find and solve problems in time. The working state information includes running time, heartbeat information and abnormal log, and the running time includes running time and running duration, for example, the running time of the tiling screen P1 is T1, the running time of the tiling screen P2 is T2, and the running time of the tiling screen P3 is T3. In addition, when the abnormality log from the terminal is received, prompt information may be generated, and the prompt information may be acousto-optic alarm information, which is not limited herein. For example, when the tiling screen P1 runs to time T4, it changes from "online state" to "offline state", and the corresponding prompt information "the tiling screen P1 is offline, please confirm whether there is a fault!" is generated to prompt the administrator to troubleshoot in time, thus improving the performance of the terminal.

Figure 4:
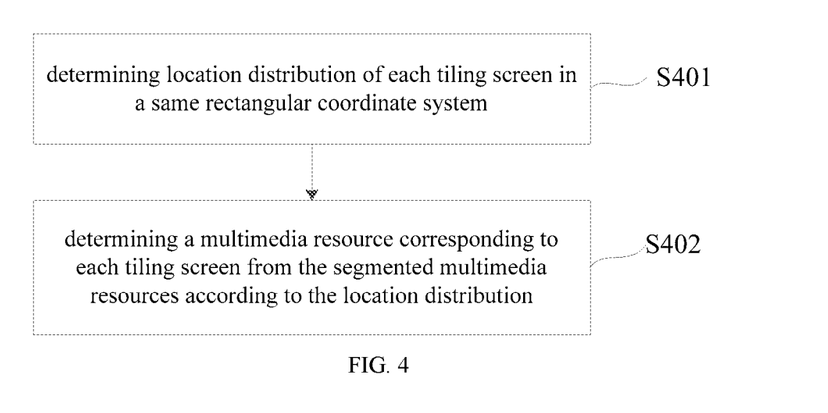
FIG. 4 is a method flowchart after the step S103 in the terminal control method according to an embodiment of the present disclosure.

In the embodiments of the present disclosure, as illustrated in FIG. 4, after the S103 of segmenting, according to the selected multiple tiling screens, a multimedia resource corresponding to the program to obtain segmented multimedia resources, the method further includes:

S401: determining location distribution of each tiling screen in a same rectangular coordinate system; and S402: determining a multimedia resource corresponding to each tiling screen from the segmented multimedia resources according to the location distribution.

In specific implementation, the implementation for S401 to S402 is as follows:

first, the location distribution of each tiling screen in the same rectangular coordinate system is determined, for example, the location of the tiling screen at the top left corner of the terminal is the coordinate origin, and the rectangular coordinate system is established with the tiling wall at which the terminal is located. The multimedia resource corresponding to each tiling screen is then determined from the segmented multimedia resources according to the location distribution of each tiling screen in the same rectangular coordinate system. For example, the terminal includes four tiling screens, including a tiling screen P1, a tiling screen P2, a tiling screen P3, and a tiling screen P4, in the same rectangular coordinate system, the tiling screen P1 is located in the upper left corner, the tiling screen P2 is located in the upper right corner, the tiling screen P3 is located in the lower left corner, and the tiling screen P4 is located in the lower right corner, the multimedia resources corresponding to these four tiling screens may be automatically determined according to the location distribution of the tiling screens, the automatic binding of the tiling screens to the multimedia resources is thus achieved, which avoids manual error rates and improves tiling efficiency compared to prior art in which tiled display is achieved by manually externally connecting the hardware box or industrial computer to the terminal and connecting the API interface provided on the terminal with the corresponding tiling screen.

Figure 5:
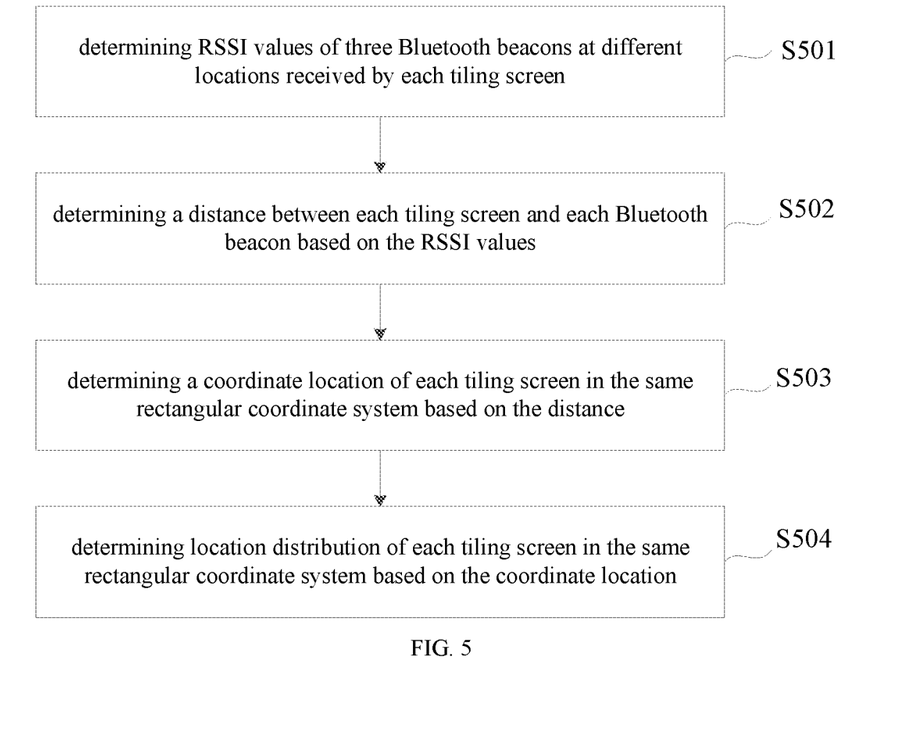
FIG. 5 is a method flowchart of a step S401 in the terminal control method according to an embodiment of the present disclosure.

In the embodiments of the present disclosure, the locating of the respective tiling screens may be achieved using Bluetooth locating, as shown in FIG. 5, the S401 of determining location distribution of each tiling screen in a same rectangular coordinate system includes:

S501: determining RSSI values of three Bluetooth beacons at different locations received by each tiling screen;

S502: determining a distance between each tiling screen and each Bluetooth beacon based on the RSSI values;

S503: determining a coordinate location of each tiling screen in the same rectangular coordinate system based on the distance; and S504: determining location distribution of each tiling screen in the same rectangular coordinate system based on the coordinate location.

In specific implementation, the implementation for S501 to S504 is as follows:

firstly, the Received Signal Strength Indication (RSSI) values received by three Bluetooth beacons at different locations are determined, the three Bluetooth beacons are arranged at fixed locations of the tiling wall where the terminal is located. Taking the tiling schematic diagram shown in FIG. 6 as an example, the terminal includes 12 tiling screens including P1, P2, ..., P12, a beacon S1 arranged at the upper left corner of the tiling wall, a beacon S2 arranged at the upper right corner of the tiling wall, and a beacon S3 arranged directly below the tiling wall. The tiling screens at different locations receive different RSSI values of the same Bluetooth beacon, and the tiling screen at the same location receives different RSSI values of the Bluetooth beacons at different locations.

Figure 6:
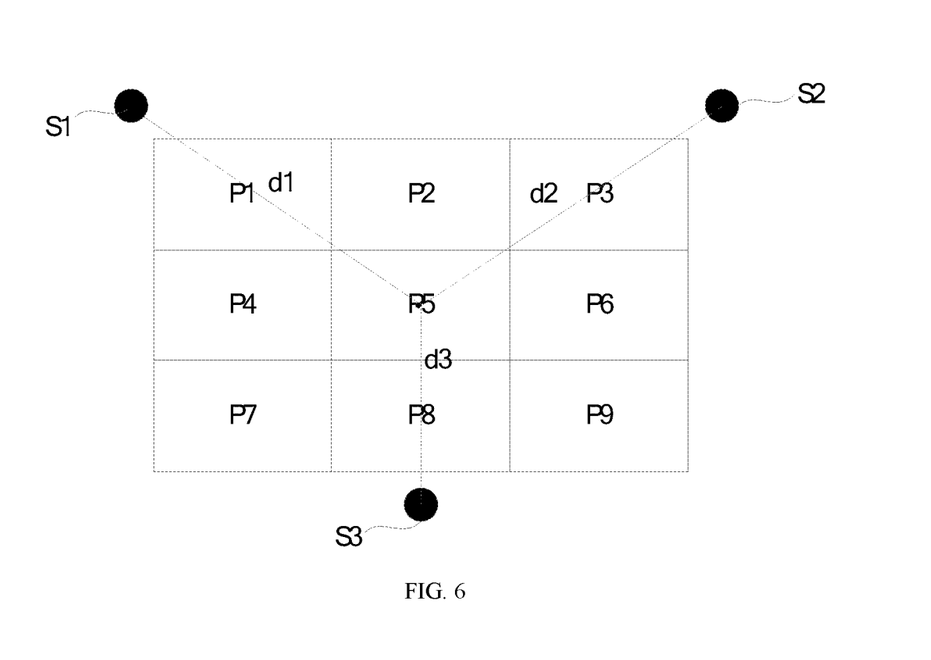
FIG. 6 is a tiling schematic diagram in the terminal control method according to an embodiment of the present disclosure.

In the embodiments of the present disclosure, after determining the RSSI values of three Bluetooth beacons at different locations received by each tiling screen, a distance between each tiling screen and each Bluetooth beacon may be determined based on the RSSI values, which may be calculated according to the following formula:

$$d=10^{((ABS(RSSI)-A)/(10n))}$$

where d represents the distance d of the tiling screen from the Bluetooth beacon, the RSSI value is used to characterize the signal strength, A represents the absolute value of the RSSI value at 1 m from a detection device, e.g., A can have a numerical range of [45, 49], n represents the environmental attenuation factor which can be adjusted to the actual environment in practical applications, and n has a numerical range of [3.25-4.5].

In the embodiments of the present disclosure, after determining the distance between each tiling screen and each Bluetooth beacon, a coordinate location of each tiling screen in the same rectangular coordinate system can be determined based on the distance, the coordinate location of each tiling screen in the same rectangular coordinate system can be determined by the principle of triangulation location, still taking the tiling schematic diagram shown in FIG. 6 as an example, the tiling screen P5 to be located has the coordinate location (x, y), the beacon S1 has the coordinate location (x1, y1), S2 has the coordinate location (x2, y2), S3 has the coordinate location (x3, y3), the distance between the tiling screen P5 and the beacon S1 is d1, the distance between the tiling screen P5 and the beacon S2 is d2, and the distance between the tiling screen P5 and the beacon S3 is d3, the corresponding formulas are as follows:

$$(x-x1)^2+(y-y1)^2=d1^2;$$

$$(x-x2)^2+(y-y2)^2=d2^2; \text{ and}$$

$$(x-x3)^2+(y-y3)^2=d3^2.$$

In specific implementation, according to the same locating principle for the tiling screen P5, the locating of each tiling screen in the terminal can be realized. After determining the coordinate location of each tiling screen in the same rectangular coordinate system, the location distribution of each tiling screen in the same rectangular coordinate system can be determined. In this way, the binding between the tiling screen at each location and the multimedia resource can be realized according to the location distribution of each tiling screen, thereby realizing the automatic binding between the tiling screen and the display content while realizing the automatic locating of each tiling screen in the terminal, and thus improving the tiling management efficiency of the terminal. In the embodiments of the present disclosure, in addition to adopting the Bluetooth beacon to realize the locating of the tiling screen, the existing technologies such as Beidou satellite and 5G can also be adopted to realize the locating, which is not limited here.

Figure 7:
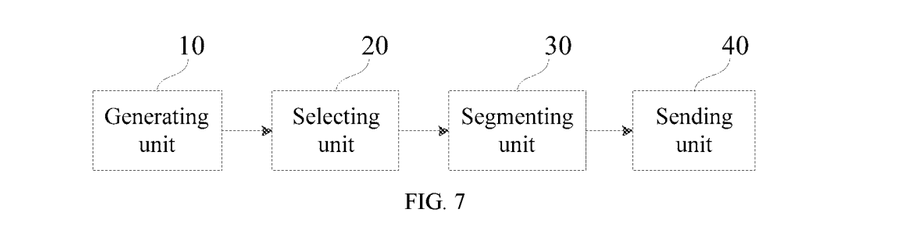
FIG. 7 is a structural schematic diagram of a terminal control apparatus according to an embodiment of the present disclosure.

Based on the same disclosed concept, as illustrated in FIG. 7, the embodiments of the present disclosure also provides a terminal control apparatus, including:
- a generating unit 10, configured to generate an orchestration plan according to a program selected by a user;
- a selecting unit 20, configured to select, according to the program and the orchestration plan, multiple tiling screens used for displaying the program from tiling screens that form a terminal;
- a segmenting unit 30, configured to segment, according to the selected multiple tiling screens, a multimedia resource corresponding to the program to obtain segmented multimedia resources; and
- a sending unit 40, configured to send the segmented multimedia resources to the multiple tiling screens, so that each tiling screen displays according to the corresponding multimedia resource and the orchestration plan.

Before the step of generating the orchestration plan according to the program selected by the user, the terminal control apparatus is configured to:
- receive material uploaded by a user, the material includes audio, video and a picture; and
- generate a program according to the material, and attribute information of the program is set, the attribute information including a name, a description, and a category.

In the embodiment of the present disclosure, the segmenting unit 30 is configured to:
- slice a multimedia resource corresponding to the program according to the selected multiple tiling screens to obtain sliced multimedia resources; and
- perform a super-resolution processing on the sliced multimedia resources to obtain super-resolution processed multimedia resources, and take the super-resolution processed multimedia resources as the segmented multimedia resources.

In the embodiments of the present disclosure, after the sending unit 40 sends the segmented multimedia resources to the multiple tiling screens, the apparatus further includes:

an adjusting unit configured to send an instruction for adjusting screen display parameters of each tiling screen to the terminal, such that the terminal adjusts the screen display parameters of each tiling screen in response to the instruction, the screen display parameters include white balance, brightness, and volume.

In the embodiments of the present disclosure, after the sending unit 40 sends the segmented multimedia resources to the multiple tiling screens, the apparatus further includes:
- a receiving unit configured to receive working state information reported by each tiling screen to monitor the terminal, the working state information includes running time, heartbeat information and abnormal log.

In the embodiments of the present disclosure, after the segmenting unit 30 obtains the segmented multimedia resources, the apparatus further includes a determining unit configured to:
- determine location distribution of each tiling screen in a same rectangular coordinate system; and
- determine a multimedia resource corresponding to each tiling screen from the segmented multimedia resources according to the location distribution.

In the embodiments of the present disclosure, the determining unit is configured to:
- determine RSSI values of three Bluetooth beacons at different locations received by each tiling screen;
- determine a distance between each tiling screen and each Bluetooth beacon by the RSSI values;
- determine a coordinate location of each tiling screen in the same rectangular coordinate system based on the distance; and
- determine location distribution of each tiling screen in the same rectangular coordinate system based on the coordinate location.

Figure 8:
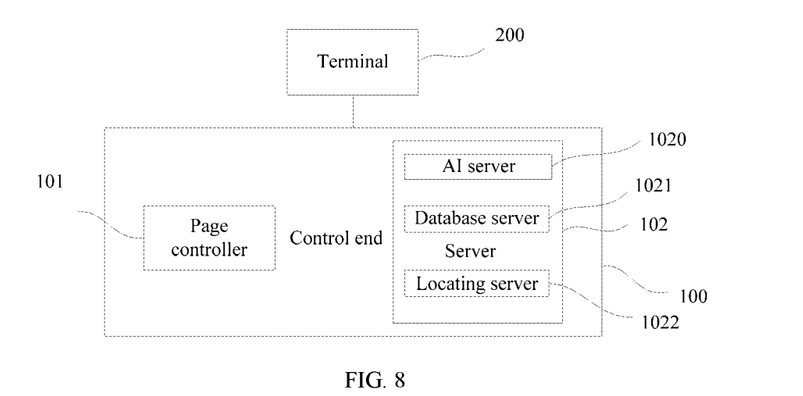
FIG. 8 is a structural schematic diagram of a terminal control system according to an embodiment of the present disclosure.

Based on the same disclosed concept, as illustrated in FIG. 8, the embodiments of the present disclosure provide a terminal control system, including:
- a control end 100 and a terminal 200,
- the control end 100 is configured to: generate an orchestration plan according to a program selected by a user; select multiple tiling screens used for displaying the program from tiling screens that form a terminal, according to the program and the orchestration plan; segment, according to the selected multiple tiling screens, a multimedia resource corresponding to the program to obtain segmented multimedia resources; and send the segmented multimedia resources to the multiple tiling screens; and
- the terminal 200 is configured to receive the segmented multimedia resources, each of the multiple tiling screens displays according to the corresponding multimedia resource.

In the embodiments of the present disclosure, the control end 100 includes a page controller 101 configured to:
- receive material uploaded by a user, the material includes audio, video and a picture; and
- generate the program according to the material, and set attribute information of the program, the attribute information including a name, a description, and a category.

In the embodiments of the present disclosure, the control end 100 includes a server 102 connected with the page controller 101, where the page controller 101 is further configured to receive an operation by a user to adjust the screen display parameters of each tiling screen and, in response to the operation, generate an instruction for adjusting the screen display parameters of each tiling screen; send the instruction to the server 102, the screen display parameters including white balance, brightness, and volume; and
the server 102 is configured to receive the instruction and send the instruction to the terminal.

In the embodiments of the present disclosure, the server 102 is further configured to receive working state information reported by each tiling screen and send the working state information to the page controller 101, the working state information includes running time, heartbeat information and abnormal log; and
the page controller 101 is configured to receive the work state information and display the work state information.

In the embodiments of the present disclosure, the server 102 includes an AI server 1020 configured to:
slice a multimedia resource corresponding to the program according to the selected multiple tiling screens to obtain sliced multimedia resources; and
performing a super-resolution processing on the sliced multimedia resources to obtain the super-resolution processed multimedia resources, and take the super-resolution processed multimedia resources as the segmented multimedia resources.

In the embodiments of the disclosure, the server 102 includes a database server 1021 configured to store the material and the program.

In the embodiments of the present disclosure, the server 102 includes a locating server 1022 configured to:
determine location distribution of each tiling screen in a same rectangular coordinate system; and
determine a multimedia resource corresponding to each tiling screen from the segmented multimedia resources according to the location distribution.

In the embodiments of the present disclosure, the locating server 1022 is configured to:
determine RSSI values of three Bluetooth beacons received by each tiling screen;
determine a distance between each tiling screen and each Bluetooth beacon based on the RSSI values;
determine a coordinate location of each tiling screen in the same rectangular coordinate system based on the distance; and
determine location distribution of each tiling screen in the same rectangular coordinate system based on the coordinate location.

Figure 9:
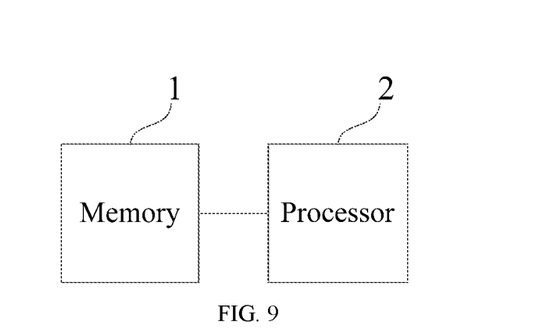
FIG. 9 is a structural schematic diagram of the terminal control apparatus according to an embodiment of the present disclosure.

Based on the same disclosed concept, as illustrated in FIG. 9, the embodiments of the present disclosure also provide a terminal control apparatus, including:
a memory 1 and a processor 2;
the memory 1 is configured to store a computer program, and the processor 2 is configured to call the computer program stored in the memory to execute;
generating an orchestration plan according to a program selected by a user;
selecting, according to the program and the orchestration plan, multiple tiling screens used for displaying the program from tiling screens that form a terminal;
segmenting, according to the selected multiple tiling screens, a multimedia resource corresponding to the program to obtain segmented multimedia resources; and
sending the segmented multimedia resources to the multiple tiling screens, so that each tiling screen displays according to the corresponding multimedia resource and the orchestration plan.

Optionally, the processor 2 may be in particular a central processing unit, an Application Specific Integrated Circuit (ASIC), or one or more integrated circuits for controlling the execution of a program.

Optionally, the memory 1 may include a Read Only Memory (ROM), a Random Access Memory (RAM), and a disk storage. The memory 1 is configured to store data necessary for the processor 2 to run, i.e., to store computer programs executable by the processor 2, and the processor 2 executes the method shown in FIG. 1 by executing the computer programs stored in the memory 1. The number of memories 1 is one or more, and the number of processors 2 is one or more.

The physical devices to which the generating unit 10, the selecting unit 20, the segmenting unit 30 and the sending unit 40 correspond may each be the processor 2 described previously. The apparatus may be configured to perform a method provided by the embodiments shown in FIG. 1, for example generating an orchestration plan according to a program selected by a user; selecting, according to the program and the orchestration plan, multiple tiling screens used for displaying the program from tiling screens that form a terminal; segmenting a multimedia resource corresponding to the program to obtain segmented multimedia resources according to the selected multiple tiling screens; and sending the segmented multimedia resources to the multiple tiling screens, so that each tiling screen displays according to the corresponding multimedia resource and the orchestration plan. Therefore, with regard to the functions that can be realized by each functional module in the apparatus, reference can be made to the corresponding description in the embodiments shown in FIG. 1, and no further details are given.

The embodiments of the present disclosure also provides a computer storage medium having stored thereon computer instructions which, when run on a computer, cause the computer to execute the aforementioned terminal control method.

Although the preferred embodiments of the present disclosure have been described, additional changes and modifications may be made to these embodiments once the basic inventive concepts are known to those skilled in the art. Therefore, the appended claims are intended to be interpreted to encompass preferred embodiments as well as all changes and modifications falling within the scope of the present disclosure.

It will be apparent that various modifications and variations may be made to the embodiments of the present disclosure by those skilled in the art without departing from the spirit and scope of the embodiments of the present disclosure. Thus, the disclosure is also intended to encompass such modifications and variations of the embodiments of the disclosure to the extent that they fall within the scope of the claims of the disclosure and their equivalents.

What is claimed is:

1. A terminal control method, comprising:
generating an orchestration plan according to a program selected by a user;
selecting, according to the program and the orchestration plan, multiple tiling screens used for displaying the program from tiling screens that form a terminal;
segmenting a multimedia resource corresponding to the program based on the selected multiple tiling screens to obtain segmented multimedia resources; and sending the segmented multimedia resources to the multiple tiling screens to allow each tiling screen displays according to a corresponding multimedia resource and the orchestration plan;

wherein before the generating the orchestration plan according to the program selected by the user, the method further comprises:

receiving material uploaded by a user, wherein the material comprises audio, video and a picture; and generating the program according to the material, and setting attribute information of the program, the attribute information comprising a name, a description, and a category.

2. The method according to claim 1, wherein the segmenting the multimedia resource corresponding to the program based on the selected multiple tiling screens to obtain the segmented multimedia resources comprises:

slicing the multimedia resource corresponding to the program according to the selected multiple tiling screens to obtain sliced multimedia resources; and performing a super-resolution processing on the sliced multimedia resources to obtain super-resolution processed multimedia resources, and taking the super-resolution processed multimedia resources as the segmented multimedia resources.

3. The method according to claim 1, wherein after the sending the segmented multimedia resources to the multiple tiling screens, the method further comprises:

sending an instruction for adjusting screen display parameters of each tiling screen to the terminal, wherein the instruction is used for indicating the terminal to adjust the screen display parameters of each tiling screen, wherein the screen display parameters comprise white balance, brightness, and volume.

4. The method according to claim 1, wherein after the sending the segmented multimedia resources to the multiple tiling screens, the method further comprises:

receiving working state information reported by each tiling screen to monitor the terminal, wherein the working state information comprises running time, heartbeat information and abnormal log.

5. A terminal control apparatus, comprising:

a memory, configured to store a computer program; and a processor, configured to call the computer program stored in the memory to execute:

generating an orchestration plan according to a program selected by a user;

selecting, according to the program and the orchestration plan, multiple tiling screens used for displaying the program from tiling screens that form a terminal;

segmenting, according to the selected multiple tiling screens, a multimedia resource corresponding to the program to obtain segmented multimedia resources; and sending the segmented multimedia resources to the multiple tiling screens to allow each tiling screen displays according to the corresponding multimedia resource and the orchestration plan;

wherein before the generating the orchestration plan according to the program selected by the user, the processor is further configured to execute:

receiving material uploaded by a user, wherein the material comprises audio, video and a picture; and generating the program according to the material, and setting attribute information of the program, the attribute information comprising a name, a description, and a category.

6. A terminal control system, comprising:

a control end and a terminal, wherein, the control end is configured to: generate an orchestration plan according to a program selected by a user; select, according to the program and the orchestration plan, multiple tiling screens used for displaying the program from tiling screens that form a terminal; segment, according to the selected multiple tiling screens, a multimedia resource corresponding to the program to obtain segmented multimedia resources; and send the segmented multimedia resources to the multiple tiling screens; and the terminal is configured to receive the segmented multimedia resources, each of the multiple tiling screens displays according to a corresponding multimedia resource;

wherein the control end comprises a page controller, and the page controller is configured to:

receive material uploaded by a user, wherein the material comprises audio, video and a picture; and generate a program according to the material, and set attribute information of the program, the attribute information comprising a name, a description, and a category.

7. The system according to claim 6, wherein the control end comprises a server connected with the page controller, wherein, the page controller is further configured to receive an operation by a user to adjust the screen display parameters of each tiling screen, and in response to the operation, generate an instruction for adjusting the screen display parameters of each tiling screen; and send the instruction to the server, the screen display parameters comprising white balance, brightness, and volume; and the server is configured to receive the instruction and send the instruction to the terminal.

8. The system according to claim 7, wherein the server is further configured to receive working state information reported by each tiling screen and send the working state information to the page controller, wherein the working state information comprises running time, heartbeat information and abnormal log; and the page controller is configured to receive the working state information and display the working state information.

9. The system according to claim 7, wherein the server comprises an artificial intelligence (AI) server, and the AI server is configured to:

slice a multimedia resource corresponding to the program according to the selected multiple tiling screens to obtain sliced multimedia resources; and perform a super-resolution processing on the sliced multimedia resources to obtain the super-resolution processed multimedia resources, and take the super-resolution processed multimedia resources as the segmented multimedia resources.

10. The system according to claim 7, wherein the server comprises a database server, and the database server is configured to store the material and the program.

11. The system according to claim 7, wherein the server comprises a location server, and the location server is configured to:

determine location distribution of each tiling screen in a same rectangular coordinate system; and determine a multimedia resource corresponding to each tiling screen from the segmented multimedia resources according to the location distribution.

12. The system according to claim 11, wherein the location server is further configured to:
- determine RSSI values of three Bluetooth beacons at different locations received by each tiling screen;
- determine a distance between each tiling screen and each Bluetooth beacon based on the RSSI values;
- determine a coordinate location of each tiling screen in the same rectangular coordinate system based on the distance; and
- determine location distribution of each tiling screen in the same rectangular coordinate system based on the coordinate location.

13. The method according to claim 2, wherein after obtaining the sliced multimedia resources, the method further comprising:
- determining location distribution of each tiling screen in a same rectangular coordinate system; and
- determining a multimedia resource corresponding to each tiling screen from the segmented multimedia resources according to the location distribution.

14. The method according to claim 13, wherein the determining the location distribution of each tiling screen in the same rectangular coordinate system comprises:
- determining RSSI values of three Bluetooth beacons at different locations received by each tiling screen;
- determining a distance between each tiling screen and each Bluetooth beacon based on the RSSI values;
- determining a coordinate location of each tiling screen in the same rectangular coordinate system based on the distance; and
- determining location distribution of each tiling screen in the same rectangular coordinate system based on the coordinate location.

* * * * *